United States Patent [19]

Takahashi et al.

[11] 4,321,677
[45] Mar. 23, 1982

[54] ANTI-SKID CONTROL DEVICE

[75] Inventors: Junichi Takahashi, Katsuta; Takanori Shibata, Hitachi, both of Japan

[73] Assignee: Hitachi, Ltd., Tokyo, Japan

[21] Appl. No.: 118,909

[22] Filed: Feb. 6, 1980

[30] Foreign Application Priority Data

Feb. 16, 1979 [JP] Japan .................................. 54-16128

[51] Int. Cl.³ .......................... G06F 15/20; B60T 8/10
[52] U.S. Cl. ...................................... 364/426; 303/95; 303/109
[58] Field of Search .................. 364/426; 303/95, 103, 303/106, 109, 110

[56] References Cited

U.S. PATENT DOCUMENTS

| | | | |
|---|---|---|---|
| 3,653,727 | 4/1972 | Kullberg et al. | 303/106 |
| 3,807,811 | 4/1974 | Nakamura et al. | 303/109 |
| 3,912,337 | 10/1975 | Ochiai | 303/109 |
| 3,985,396 | 10/1976 | Kuwana et al. | 364/426 X |
| 4,006,942 | 2/1977 | Saito | 303/109 |
| 4,094,556 | 6/1978 | Okamoto et al. | 303/109 |
| 4,157,850 | 6/1979 | Marouby | 364/426 X |
| 4,184,203 | 1/1980 | Skarvada | 364/426 |

*Primary Examiner*—Jerry Smith
*Attorney, Agent, or Firm*—Craig and Antonelli

[57] ABSTRACT

The control circuit comprises a memory circuit and a calculation circuit. The control circuit derives wheel speed from a detector, and delivers a brake release signal and a braking signal to a hydraulic brake system of a vehicle after the occurrence of a skid. A memory circuit beforehand memorizes optimum control patterns shown by the function of time and vehicle velocity corresponding to slip rate between wheel and road surfaces. A calculation circuit determines a slip rate by referring to wheel speed, and selects an optimum control pattern corresponding to the calculated slip rate from the memory circuit. Then, the calculation circuit controls the hydraulic brake system in accordance with the selected optimum pattern. When the slip rate becomes 50% after the panic braking, the calculation circuit releases the oil pressure of the hydraulic brake system and, when the slip rate becomes 20% after the panic braking, the calculation circuit outputs the braking signal to the hyraulic brake system.

7 Claims, 6 Drawing Figures

ANTI-SKID CONTROL DEVICE

BACKGROUND OF THE INVENTION

This invention relates to an anti-skid control device and, more particularly, to an anti-skid control device incorporating a microcomputer for controlling a skid. Such anti-skid control device is for the purpose of automatically releasing a braking force applied to wheels of a vehicle during braking operations to prevent wheel locking and thus to insure a safe braking operation.

Generally, an automobile is steerable due to friction between road surfaces and wheels, and can run safely as long as a frictional force, or a clinging force, of the wheels is maintained at a suitable value. However, if a force exceeding the clinging force of the wheels acts on the automobile, the wheel or wheels slip on the road surface preventing a normal running of the automobile and causes abnormal running conditions. This condition is generally referred to as "skid".

The skid is affected by various factors. One of these factors is a speed of the automobile. A high automobile speed tends to cause a spin of the automobile even at a small steering angle. Abrupt increases in a yawing angle velocity and in a slip angle of rear wheels are observed in a state of spinning. The skid condition is also affected by a frictional coefficient of the road surface. For instance, comparing a concrete road surface (frictional coefficient 0.8) with a wet road surface (frictional coefficient 0.4), the spin takes place at a smaller steering angle in the case of the road surface with a small frictional coefficient, i.e. the wet road surface, than in the case of the road surface with a higher frictional coefficient.

A typical and conventional anti-skid controlling method is to compare a wheel speed with a estimated vehicle velocity by using a comparator and to control the brake release valve successively by the output of the comparator.

A device of the type described above is shown in U.S. Pat. No. 4,094,556, for example.

However, the device of the prior art for an anti-skid control device has had the disadvantage that a considerably long time lag is observed for the anti-skid control because it is time consuming to perform a continuous calculation of slip ratio from wheel velocity and estimated vehicle velocity to determine the timing of the brake releasing operation.

SUMMARY OF THE INVENTION

An object of this invention is to provide an anti-skid control device which is capable of controlling a skid with an optimum braking in the occurrence of skid by panic braking.

Another object of this invention is to provide an anti-skid control device which is capable of controlling a skid quickly.

Still another object of this invention is to provide an anti-skid control device which is capable of controlling a skid based on the condition of road surfaces.

A further object of this invention is to provide an anti-skid control device which is capable of controlling a skid effectively.

To this end, according to the invention, at least one skid control pattern corresponding to a slip rate previously obtained through experiments is memorized beforehand in a memory so that an anti-skid control is made in accordance with the controlling pattern corresponding to the rate of slip actually taking place.

DESCRIPTION OF THE PREFERRED EMBODIMENTS

Figure 1:
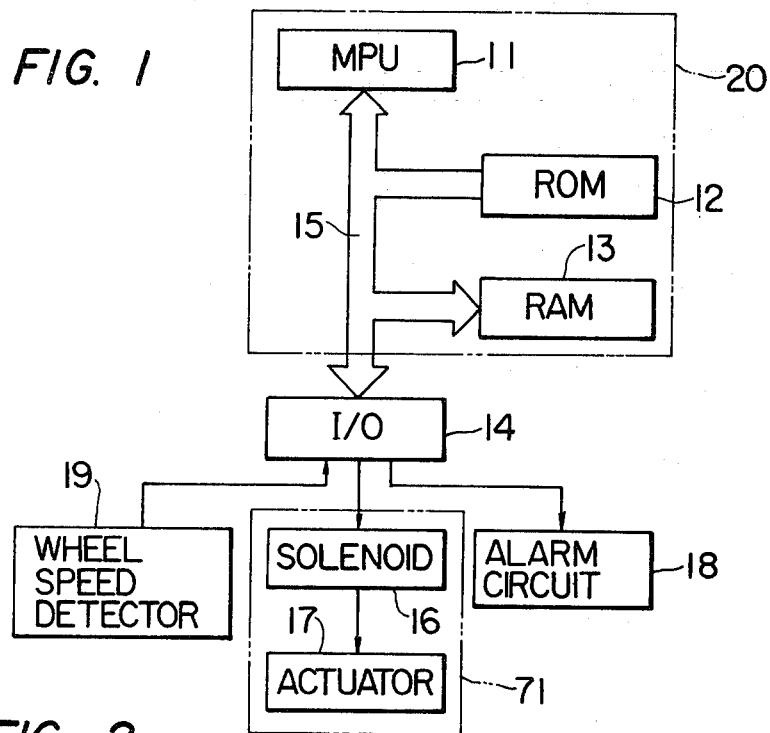
FIG. 1 is a block diagram of an embodiment of the invention.

Referring to FIG. 1, an anti-skid control device embodying the present invention comprises a control circuit, a wheel speed detector 19, a hydraulic brake system 71 of a vehicle, and an alarm circuit 18. A control circuit comprises a microcomputer 20 and an input/output port 14 (hereinafter referred to as I/O). A microcomputer 20 comprises a microprocessing unit 11 (hereinafter referred to as MPU), a read only memory 12 (hereinafter referred to as ROM), a random access memory 13 (hereinafter referred to as RAM), and a bus line 15. The RAM 13 contains the resetable memory for event counting. The MPU 11 contains the resettable register for calculation. The hydraulic brake system 71 comprises a solenoid 16 and an actuator 17.

In the arrangement as shown in FIG. 1, the MPU 11 is adapted to perform various functions such as execution of instructions in accordance with the programs written in ROM 12, storing data in the RAM 13 for a temporary memorization for these data, and inputs and outputs of required signals. The I/O 14 is adapted to receive signals derived from the wheel speed detector 19 and to deliver the signals such as an anti-skid control signal to the hydraulic brake system 71 of the vehicle, and a fail-safe signal to the alarm circuit 18.

Before the detailed explanation of the principle of the present invention, slip rate will be described hereinunder.

Suppose an automobile is running on a flat road surface at a speed of V. If there is no slip between the tire of the automobile and the road surface, the V is defined as a following formula (1).

$$V = \omega R \tag{1}$$

where
R: the radius of the tire, and
ω: the angular velocity of the tire.

On the other hand, if there is a slip between the tire of the automobile and the road surface, the V is written as the following formula (2).

$$V \neq \omega R \tag{2}$$

The slip rate S is defined as follows.

$$S = (V - \omega R) \times 100 / V \, (\%) \tag{3}$$

Figure 2:
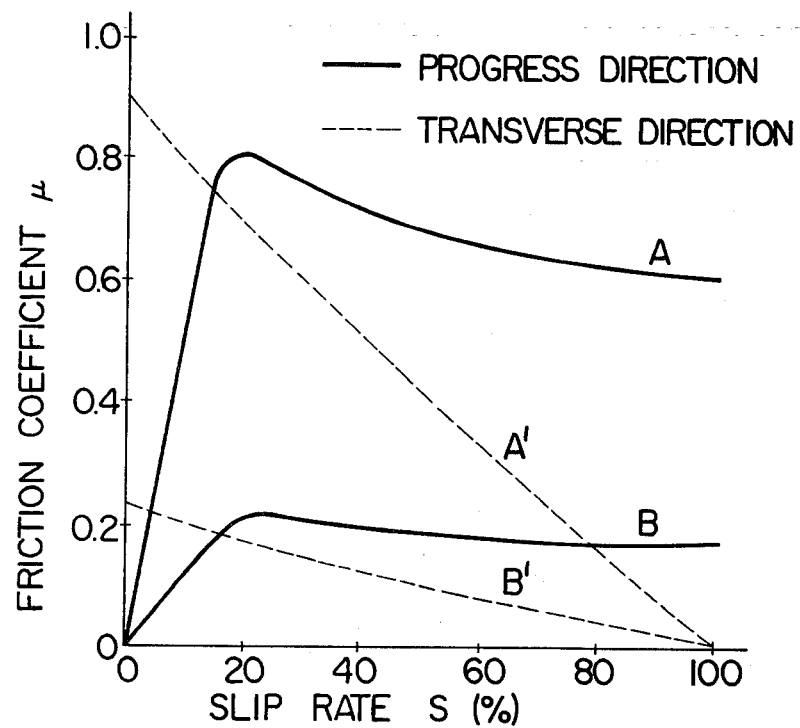
FIG. 2 is a chart showing the relation between the slip rate and the frictional coefficient.

FIG. 2 is a chart showing the relation between the slip rate S and the friction coefficient $\mu$ between the tire and the road surface. Generally, the frictional coefficient $\mu$ is shown as a function of slip rate S. As shown in FIG. 2, the frictional coefficient in the progress direction of a vehicle indicates the maximum value at the point nearly 20% slip rate, and the frictional coefficient in the transverse direction of a vehicle decreases in proportion as the slip rate S increases.

In FIG. 2, A and A' denote the characteristic curves in the case of a concrete road, B and B' denote the characteristic curves in the case of a snowy road. As will be seen from FIG. 2, the controlling of a vehicle to have a slip rate 20% makes the frictional coefficient $\mu$ between the tire and the road surface maximum in the state of skid. In the present invention, the anti-skid control device controls the slip rate S to be 20%.

The following is the definition of the estimated vehicle velocity. In order to calculate slip rate S according to the formula (3), it is necessary to detect the vehicle speed V. In case of an automobile, as it is equipped with four wheel brakes, it is impossible to detect the wheel velocity directly. Then, it is convenient to calculate slip rate by using the following estimated vehicle velocity instead of the actual wheel velocity.

The following is the motion equation of a vehicle in the case of braking.

$$F_f = \mu_f W_f \quad (4)$$

$$F_r = \mu_r W_r \quad (5)$$

$$\frac{W}{g} \frac{dV}{dt} = -(F_f + F_r) + \frac{1}{2}\rho C_r S V^2 \quad (6)$$

where
- $F_f$: braking force of front wheel,
- $F_r$: braking force of rear wheel,
- W: vehicle weight,
- $W_f$, $W_r$: suppressed weights in front and rear wheels,
- $\mu_f$, $\mu_r$: frictional coefficients between front, rear wheels and road surface,
- V: vehicle velocity,
- $\rho$: density of the air,
- Cr: resistance coefficient of the air, and
- g: gravity.

When it is possible to neglect the air resistance, and further the front and rear wheels are locked, the following formula (7) is utilized.

$$\mu_f = \mu_r = \mu \quad (7)$$

And, vehicle weight W is deemed as follows.

$$W = W_f + W_r \quad (8)$$

Therefore, formula (6) is transferred as follows.

$$\frac{W}{g}\frac{dV}{dt} = -\mu W \quad (9)$$

$$\therefore dV/dt = -\mu g \quad (10)$$

In the formula (10), suppose that frictional coefficient $\mu = 1$ (maximum value), then the formula (10) is transferred as follows.

$$dV/dt = -g \quad (11)$$

Thus, the deceleration velocity dV/dt of vehicle in the case of braking is represented as "$-g$".

By regarding this "$-g$" as estimated vehicle velocity, then slip rate S shown by formula (3) can be calculated by putting "$-g$" in the place of vehicle velocity therein.

As mentioned above, the present invention can be summed up as follows:
(i) Slip rate S can be calculated by regarding the estimated vehicle velocity "$-g$" as the vehicle velocity, and
(ii) Hydraulic brake system of the vehicle controls the brake oil pressure so that the slip rate S of the vehicle becomes approximately 20% by the instruction of the computer 20 through the I/O 14.

Figure 3:
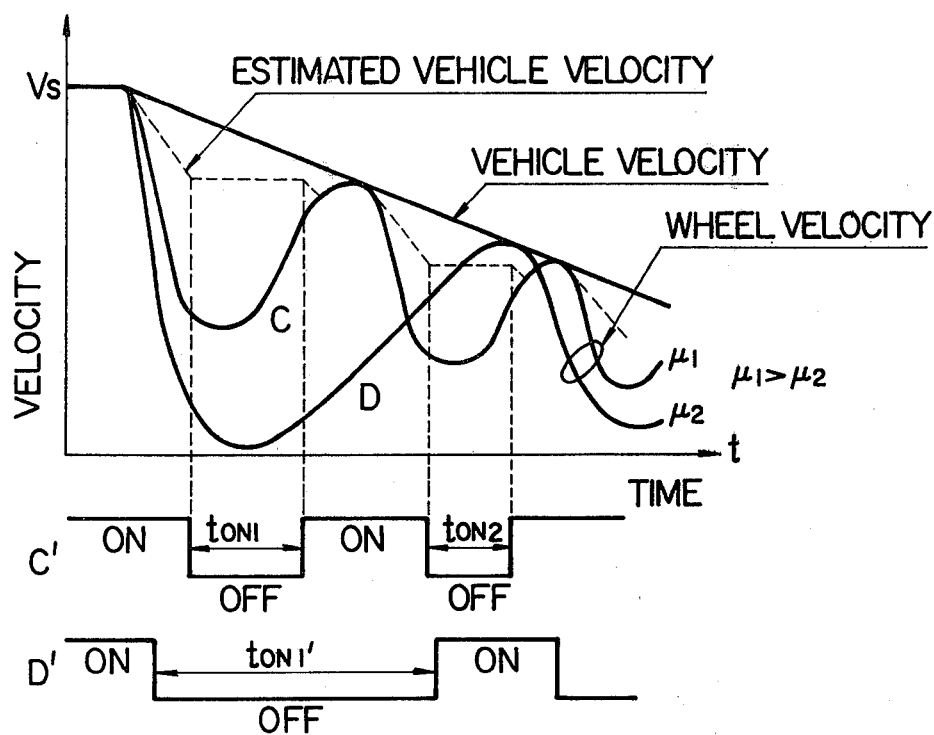
FIG. 3 is a chart showing the relation between the automobile speed and the wheel speed.

FIG. 3 is a chart showing the relation among the actual vehicle velocity, the estimated vehicle velocity, the wheel velocity, and an increase (ON) or a decrease (OFF) signal of the brake oil pressure in the case of brake oil pressure being controlled by the actuator 17 so that the frictional coefficient between the wheel and the road surfaces becomes maximum.

In FIG. 3, suppose an automobile is running at the speed of Vs. In the case of panic braking, the wheel velocity decreases as shown at the curve C in the large frictional coefficient ($\mu_1$) road, and the curve D in the small frictional coefficient ($\mu_2$) road.

On the other hand, in the case of panic braking, the vehicle velocity is deemed to be substantially equal to the estimated vehicle velocity in principle. The estimated vehicle velocity is compared with the curve C or D in order to obtain the slip rate according to the formula (3). In FIG. 3 the time chart C' and D' denote the wave forms of the output signal produced when the wheel velocity changes as shown at C and D, respectively.

When the slip rate becomes the appointed slip rate 50%, the anti-skid control device of the present invention outputs the brake release signal "OFF" as shown at the time chart C' or D'.

After the brake release signal has been delivered, the wheel velocity becomes again faster than the velocity at the time that the output signal C' or D' has been turned off.

When the slip rate becomes 20%, the anti-skid control device of the present invention outputs the brake signal "ON" as shown at the time chart C' or D'.

The time duration $t_{ON}$ of the brake release signal changes in accordance with the value of the frictional coefficient.

The timing of the present invention is as follows. The ROM 12 holds the value of the estimated vehicle velocity at the time that the output signal C' or D' has turned off. The MPU 11 compares the estimated vehicle velocity with the actual wheel velocity after the output signal C' or D' has been turned off, and calculates the slip rate.

The MPU 11 outputs the brake signal "ON" when the slip rate reaches the predetermined 20% slip rate.

Namely, while the computer 20 outputs the brake release signal, it holds the estimated vehicle velocity.

Experiment shows an abrupt increase of yawing angle velocity and the slip angle of rear wheels can be minimized by brake releasing at 50% slip rate.

Figure 4:
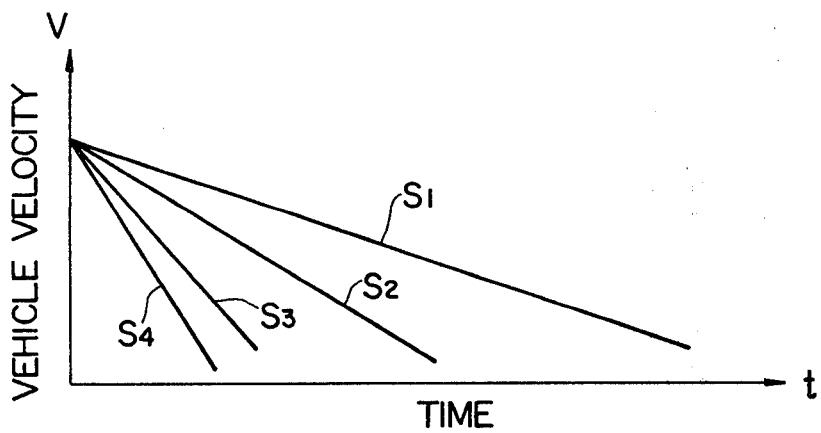
FIG. 4 is a chart showing the attenuation of the automobile speed as observed when the wheels of the automobile are locked due to a panic braking on roads for different slip rates.

FIG. 4 shows characteristic curves which represent the deceleration of an automobile or a vehicle with its wheel locked due to a panic braking on various roads of different slip rates. In this Figure, the characteristic curve $S_1$ shows the deceleration of an automobile with its wheels locked due to a panic braking on an icy road or a road having an equivalent frictional coefficient. Similarly, the characteristic curves $S_3$ and $S_4$ represent the state of deceleration of the automobile with its wheels locked due to a panic braking on a wet asphalt road or road having an equivalent frictional coefficient and dried concrete road or road having an equivalent frictional coefficient, respectively.

As will be seen from this Figure, the automobile can be stopped in a comparatively short distance when on the dry concrete road, but runs a considerably long distance before it is stopped when on the icy road. Experiment shows the gradients of these deceleration curves fall within the range between $-1.4G$ m/sec$^2$ and $-1.7G$ m/sec$^2$ (G: acceleration of gravity).

The operation of the device of the present invention will be described hereinunder.

The wheel speed detector 19 detects the wheel speed intermittently at a constant time interval or an interval varied in accordance with the wheel velocity. The output from this detector 19 is stored in the RAM 13 through the I/O 14.

When the difference between the wheel speed detected before the panic braking and the wheel speed after lapse of predetermined period time from braking reaches the predetermined value stored in the ROM 12, the MPU 11 judges the skid is taking place.

The control after this judgement made by the MPU 11 varies depending on the program of the ROM 12.

For instance, it is possible to assume that an automobile is running along an imaginary road on which the slip rate is constant.

In such a case, the skid is controlled irrespective of the actual road condition, in accordance with a typical or representative single control characteristic curve $S_2$ shown in FIG. 4 which is optimum for the anti-skid control on the imaginary road surface. To this end, the microcomputer 20 controls the hydraulic brake system of the vehicle 7 in such a manner that the wheel velocity is decreased so as to follow the curve as shown in FIG. 3.

It is also possible to effect an anti-skid control in accordance with a control characteristic corresponding to the slip rate at the moment of occurrence of the skid, irrespective of the change of the slip rate after the occurrence of the skid. In this case, the slip rate is calculated from the wheel speeds which are picked up successively. On the other hand, a plurality of automobile speed attenuation characteristic curves corresponding to a plurality of frictional coefficients are stored beforehand in the ROM 12, and a speed attenuation characteristic corresponding to the calculated slip rate is selected. In this case, the speed attenuation characteristic corresponds to the estimated vehicle velocity in FIG. 3. Then, the hydraulic brake system of the vehicle 71 is operated to effect an anti-skid control in accordance with the selected automobile speed attenuation characteristic.

It is also possible to continuously detect the skid and calculate the slip rate so as to control the anti-skid in accordance with each calculated slip rate.

In this case, the MPU 11 continuously calculates the slip rate from the wheel speeds which are detected successively and selects one of the attenuation curves for different road conditions stored in the ROM 12, to which the calculated slip rate corresponds. Then, the slip rate S of the automobile is determined from the relationship between the attenuation characteristic curves shown in FIG. 4 and the detected wheel speed. The solenoid 16 is then operated through the I/O 14 to actuate the actuator 17 thereby to control the brake in such a manner as to provide the maximum frictional coefficient.

Figure 5:
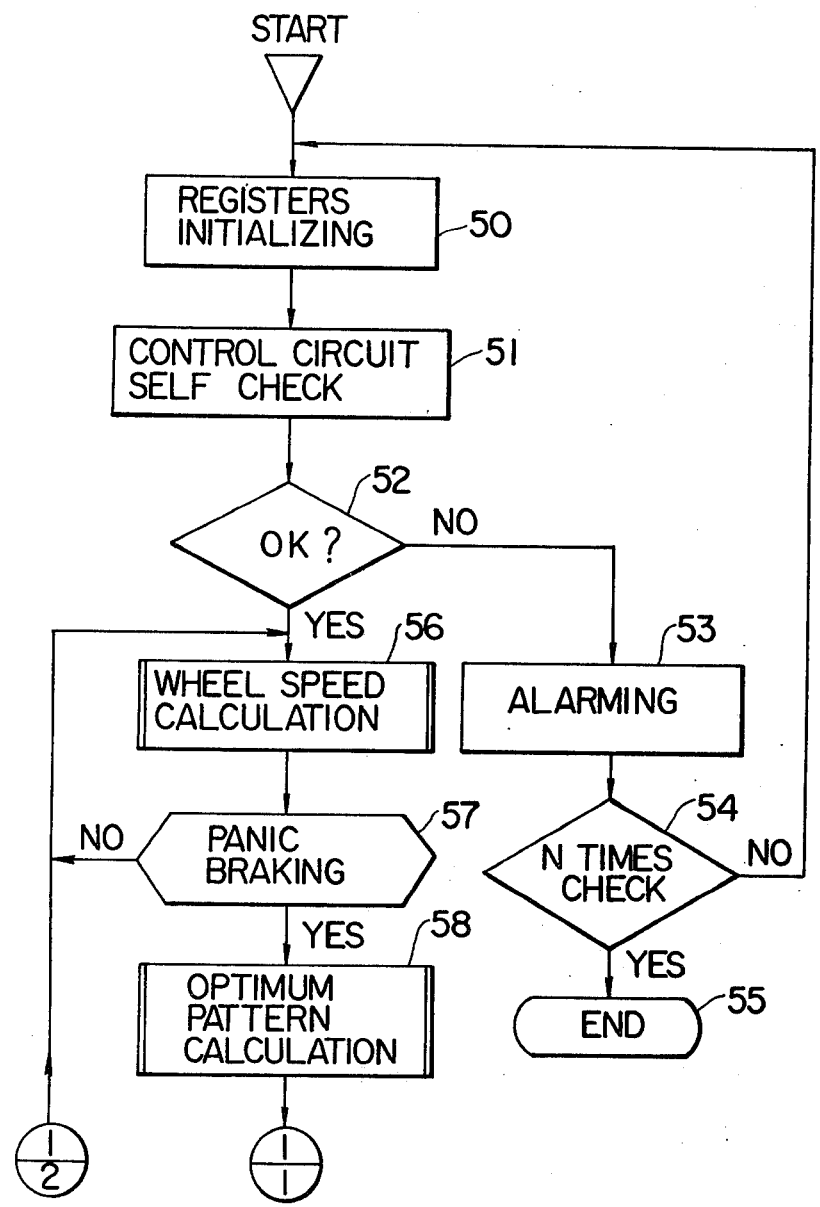
FIGS. 5 and 6 are flow charts of the anti-skid control made in accordance with the described embodiment of the invention.
Figure 6:
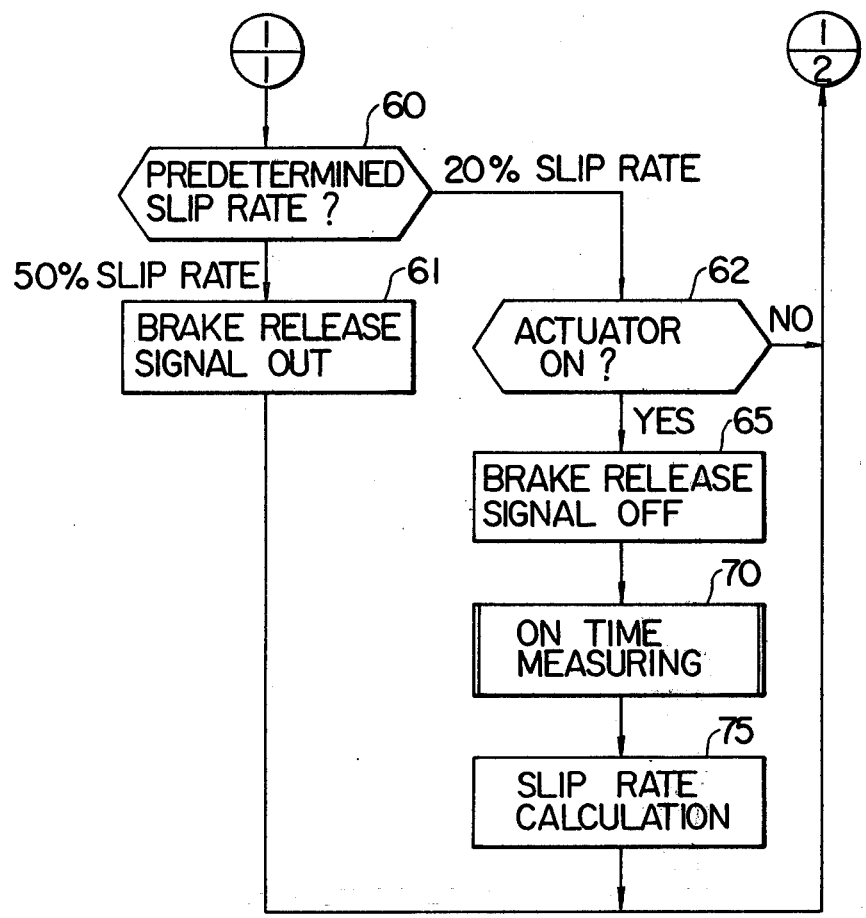

FIG. 5, and FIG. 6 show the flow chart of the anti-skid control of the present invention.

Referring to FIG. 5, the microcomputer 20 initializes all the registers, or resetable memory and register at the RAM 13 and the MPU 11, respectively, at the step 50 by the instruction of a start signal of the automobile. At the step 51, the microcomputer 20 self-checks the functions of the control circuits, especially, the ROM 12, the RAM 13, and the I/O 14. The MPU 11 gives the specific patterns to the control circuits so as to check the control circuits. When the control circuits output the reply signals corresponding to the specific patterns, the control circuits are judged to be in normal condition by the MPU 11. If an abnormal condition is detected at the step 51 of self-check, it is announced to the alarm circuit 18 at the step 53. At the same time, the control circuit is self-checked whether it is in normal condition or not, predetermined N times at the step 54. If an abnormal condition is not removed after N times check 54, it is anounced by the alarm lamp in the alarm circuit 18, and the anti-skid control device is stopped at the step of 55.

When the control circuit is self-checked and judged to be in normal condition at the step 52, the program of the ROM 12 advances to the step 56. At the step 56, the register of I/O 14 stores the values of the wheel speed through the wheel speed detector 19. And the MPU 11 calculates the wheel velocity by referring to the memory of the I/O 14. At the step 57, the MPU 11 judges whether the panic braking occurs by referring to the variation of the wheel speed. When the panic braking does not occur, the program of the ROM 12 advances to the step 56 and the MPU 11 calculates the wheel velocity. In the normal driving, the microcomputer 20 repeats the calculation of the wheel speed within the loop of steps 56 and 57. When the panic braking is detected at the step 57, the program of the ROM 12 advances to the step 58. At the step 58, the slip rate S is calculated. And the speed attenuation characteristics corresponding to the calculated slip rate are selected. At the step 60, the MPU 11 judges whether the slip rate reaches the predetermined value, that is, 50% slip rate or 20% slip rate. When the slip rate becomes 50%, the microcomputer 20 outputs the brake release signal at the step 61. After the output of the brake release signal, the program of the ROM 12 advances to the step 56. When the slip rate becomes 20%, the microcomputer 20 checks whether the actuator 17 is ON or OFF. When the MPU 11 judges the actuator 17 is OFF, the program of the ROM 12 advances to the step 56. When the MPU 11 judges the actuator 17 is ON, the program of the ROM 12 advances to the step 65. At the step 65, the brake release signal is cut off. At the step 70, the microcomputer 20 measures "ON TIME" (the time interval of the brake release signal). At the step 75, the slip rate which is necessary for the next brake releasing timing is calculated, and it is stored in the ROM 12. After the step 75, the program advances the step to that of 56.

As has been described, according to the invention, the skid which takes place when the automobile is braked abruptly is controlled to provide the optimum braking condition.

What is claimed is:

1. An anti-skid control device for a wheeled vehicle having a wheel speed detector of the vehicle, a brake system of the vehicle for controlling the braking force of the vehicle, and a control circuit which outputs a brake release signal and a brake signal to the brake system in accordance with an output signal delivered from the wheel speed detector, said control circuit comprising:

a first memory circuit means for memorizing beforehand at least one optimum control pattern to control said brake system, said optimum control pattern being expressed as a function of time and vehicle velocity corresponding to a slip rate between the wheel and a road surface, said first memory circuit means further storing a predetermined value, a second memory circuit means for memorizing temporarily wheel speed detected by said wheel speed detector, and a calculation circuit means for calculating the slip rate of the vehicle when the difference between the wheel speed stored in said second memory circuit means before panic braking and the wheel speed stored in said second memory circuit means after lapse of a predetermined time from the braking reaches the predetermined value stored in said first memory circuit means, said calculation circuit means outputting the brake release signal and brake signal to said brake system in accordance with said optimum control pattern of said first memory circuit means.

2. An anti-skid control device according to claim 1, wherein:

said calculation circuit means outputs the brake release signal to said brake system when the slip rate becomes a predetermined first value and outputs the brake signal to said brake system when the slip rate becomes a predetermined second value, said first value being larger than said second value.

3. An anti-skid control device according to claim 2, wherein:

said first value of the slip rate of said calculation circuit is 50%.

4. An anti-skid control device according to claim 2, wherein:

said second value of the slip rate of said calculation circuit is 20%.

5. An anti-skid control device according to claim 1, wherein:

said first memory circuit means memorizes a plurality of optimum control patterns corresponding to slip rate, and said calculation circuit means selects an optimum control pattern corresponding to the calculated slip rate from said first memory circuit means, and outputs the brake release signal and brake signal in accordance therewith.

6. An anti-skid control device according to claim 1, wherein:

said calculation circuit means introduces the output signal of the wheel speed detector intermittently at a constant time interval, and calculates the slip rate thereby.

7. An anti-skid control device according to claim 1, wherein:

said calculation circuit means introduces the output signal of the wheel speed detector intermittently at an interval varied in accordance with the wheel velocity, and calculates the slip rate thereby.

* * * * *